(12) United States Patent
Nagashima et al.

(10) Patent No.: US 12,460,939 B2
(45) Date of Patent: Nov. 4, 2025

(54) SYSTEMS AND METHODS FOR VACANT PROPERTY IDENTIFICATION AND DISPLAY

(71) Applicant: Toyota Motor and Engineering & Manufacturing North America, Inc., Plano, TX (US)

(72) Inventors: Satoshi Nagashima, Long Island City, NY (US); John F. Daly, Frisco, TX (US); Adrian Lombard, Royal Oak, MI (US); Paul Li, Mountain View, CA (US); Kruti Vekaria, Arlington, VA (US); Baik Hoh, Mountain View, CA (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 234 days.

(21) Appl. No.: 17/740,613

(22) Filed: May 10, 2022

(65) Prior Publication Data
US 2023/0366695 A1 Nov. 16, 2023

(51) Int. Cl.
*G01C 21/36* (2006.01)
*G01C 21/00* (2006.01)
(Continued)

(52) U.S. Cl.
CPC ..... *G01C 21/3685* (2013.01); *G01C 21/3605* (2013.01); *G01C 21/3617* (2013.01);
(Continued)

(58) Field of Classification Search
CPC ........... G01C 21/3685; G01C 21/3605; G01C 21/3617; G01C 21/3679; G01C 21/3682;
(Continued)

(56) References Cited

U.S. PATENT DOCUMENTS 10,113,279 B2  10/2018  Stevens et al.
10,242,034 B1 *  3/2019  Li ....................... G06F 16/4393
(Continued)

FOREIGN PATENT DOCUMENTS

CN   106097175 A   11/2016
CN   109784306 B   3/2020
CN   112767736 A   5/2021

OTHER PUBLICATIONS

"Protecting Pedestrians with Vehicle Barriers and Fences"; University Security; 5 pgs; Aug. 5, 2019; (https://www.campussafetymagazine.com/university/pedestrians-vehicle-barriers-fences/).

*Primary Examiner* — Roberto Borja
(74) *Attorney, Agent, or Firm* — Dinsmore & Shohl LLP

(57) ABSTRACT

A location matching method is provided. The method comprises receiving one or more photos of one or more vacant properties and surroundings of the one or more vacant properties, processing the one or more photos of the one or more vacant properties and surroundings of the one or more vacant properties to extract features related to the surroundings of the one or more vacant properties, generating one or more tags descriptive of the one or more photos based on the features that are extracted, receiving a preference from a user, and generating for output to the user one or more recommended properties based on a comparison of the one or more tags and the preference.

17 Claims, 5 Drawing Sheets

(51) Int. Cl.
    *G05D 1/00*     (2024.01)
    *G06F 16/29*     (2019.01)
    *G06F 16/583*     (2019.01)
    *G06F 16/9535*     (2019.01)
    *G06F 16/9537*     (2019.01)
    *G06V 10/40*     (2022.01)
    *G06V 20/56*     (2022.01)
    *G08G 1/14*     (2006.01)

(52) U.S. Cl.
    CPC ..... *G01C 21/3679* (2013.01); *G01C 21/3682* (2013.01); *G01C 21/3804* (2020.08); *G05D 1/0225* (2013.01); *G06F 16/29* (2019.01); *G06F 16/583* (2019.01); *G06F 16/9535* (2019.01); *G06F 16/9537* (2019.01); *G06V 10/40* (2022.01); *G06V 20/56* (2022.01); *G08G 1/141* (2013.01)

(58) Field of Classification Search
    CPC ... G01C 21/3804; G06F 16/29; G06F 16/583; G06F 16/9535; G06F 16/9537; G06V 10/40; G06V 20/56; G08G 1/141
    See application file for complete search history.

(56) References Cited

U.S. PATENT DOCUMENTS

| | | | |
|---|---|---|---|
| 11,783,385 B1* | 10/2023 | Khosravan | G06Q 50/16 382/103 |
| 2009/0204600 A1* | 8/2009 | Kalik | G06F 16/90335 707/999.005 |
| 2012/0215702 A1* | 8/2012 | Thibeault | G06Q 50/16 705/313 |
| 2016/0092959 A1* | 3/2016 | Gross | G06Q 30/0625 705/26.62 |
| 2016/0093007 A1* | 3/2016 | Richardson | G06Q 30/0611 705/26.4 |
| 2017/0032481 A1* | 2/2017 | D'Souza | G06F 18/22 |
| 2021/0043026 A1 | 2/2021 | Ledoux et al. | |
| 2022/0122202 A1* | 4/2022 | Bachia | G06Q 50/16 |

\* cited by examiner

SYSTEMS AND METHODS FOR VACANT PROPERTY IDENTIFICATION AND DISPLAY

TECHNICAL FIELD

The embodiments described herein generally relate to location matching, and more particularly, to generating one or more properties based on extracting features that relate to the surroundings of one or more properties.

BACKGROUND

Conventionally, a process of identifying vacant properties for parking vehicles, temporary structures, and so forth, may not incorporate or may not be based on the preferences of specific users. As such, conventionally, users may not be provided with a full range of suitable vacant property locations for use. These users may thus be forced to manually search through a wide range of vacant locations, possibly travel to one or more of these locations to determine whether these locations are suitable for their respective purposes, in addition to possibly contacting various parties in order to making arrangements for using these properties.

Accordingly, a need exists for a software application or system that identifies vacant properties for use that are tailored to the specific preferences of the users.

SUMMARY

In one embodiment, a location matching method is provided. The location matching method comprises receiving one or more photos of one or more vacant properties and surroundings of the one or more vacant properties, processing the one or more photos of the one or more vacant properties and surroundings of the one or more vacant properties to extract features related to the surroundings of the one or more vacant properties, generating one or more tags descriptive of the one or more photos based on the features that are extracted, receiving a preference from a user. and generating for output to the user one or more recommended properties based on a comparison of the one or more tags and the preference.

In another embodiment, a location matching system is described. The location matching system comprises a processor configured to perform operations that comprise receiving one or more photos of one or more vacant properties and surroundings of the one or more vacant properties, processing the one or more photos of the one or more vacant properties and surroundings of the one or more vacant properties to extract features related to the surroundings of the one or more vacant properties, generating one or more tags descriptive of the one or more photos based on the features that are extracted, receiving a preference from a user, and generating for output to the user one or more recommended properties based on a comparison of the one or more tags and the preference.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

As stated above, conventional processes of identifying vacant properties for use have numerous limitations. In particular, conventionally, users may not be provided with a full range of suitable vacant properties for use that are tailored to and match the preferences of users. As such, users may conventionally be forced to manually search through a wide range of vacant locations and possibly have to travel to one or more of these locations in order to determine whether these locations are suitable for their purposes. As such, conventional techniques fail to provide a full range of appropriate and suitable vacant properties that meet all of the preferences and/or criteria specific to the user.

The vacant location identification system as described in the present disclosure addresses and overcomes these deficiencies. In particular, the vacant location identification system of the present disclosure enables for the upload of images of various vacant properties from various perspectives. Thereafter, the system may utilize one or more software applications to analyze the images and identify one or more points of interest located within a particular vicinity of the vacant properties, e.g., within a 1 mile radius, a 2 mile radius, a 5 mile radius, and so forth. Thereafter, the system may generate digital tags associated with the vacant properties and the points of interest within a particular radius of the vacant properties, and upon receiving data detailing vacant property preferences from one or more devices that are external to the system, may match the digital tags with the property preferences. It is noted that these devices may be associated with various users that are interested in utilizing the vacant properties for a fixed timeframe. In this way, the system may identify vacant properties that are suitable for and satisfy one or more of the specific property preferences of various users. In embodiments, the system may also determine whether the identified vacant properties are in compliance with various zoning ordinances, city codes, state regulations, and so forth.

Figure 1:
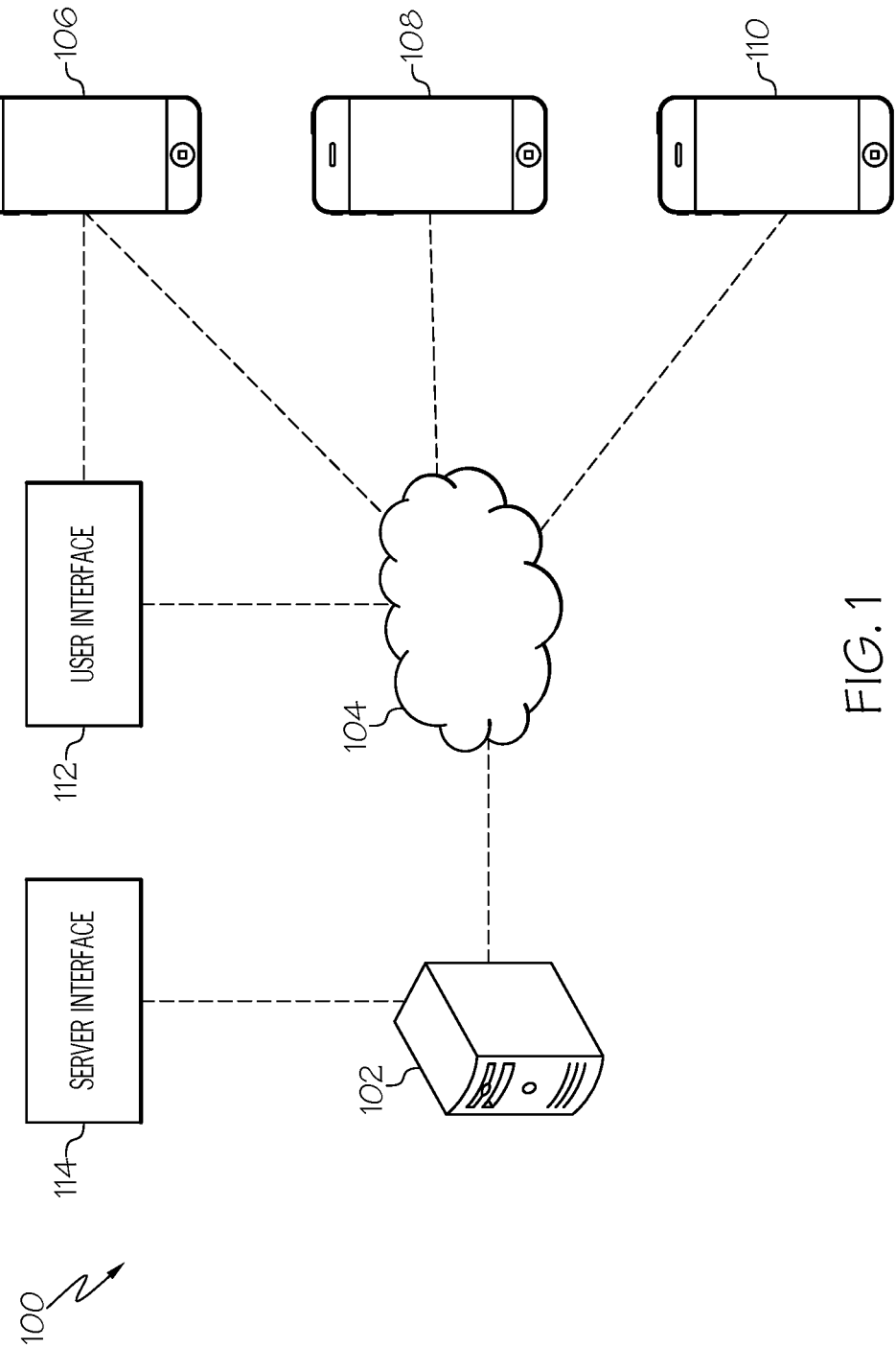
FIG. 1 depicts an example implementation of the vacant location identification system described herein, according to one or more embodiments described and illustrated herein.

FIG. 1 depicts an example implementation of the vacant location identification system 100 described herein, according to one or more embodiments described and illustrated herein. For example, in embodiments, the location identification system 100 as described in the present disclosure may include a server 102 that is communicatively coupled with a plurality of mobile devices 106, 108, and 110 via a communication network 104. The components of each of the mobile devices 106, 108, 110 and the server 102 are described in detail below and illustrated in detail in FIG. 2. In embodiments, each of the mobile devices 106, 108, 110 may access a software application, a website, and so forth, via the cloud. These devices may also transmit and receive instructions, data, images, and so forth, from the server 102 via the communication network 104.

In embodiments, the software application may have a user interface 112 and a server interface 114. The user interface 112 may be accessible via each of the mobile devices 106, 108, 110 by the respective users of these devices. Similarly, the server interface 114 may be accessible via the server 102, and via one or more computing devices that are communicatively coupled to the server 102, or via one or more additional mobile devices that are communicatively coupled to the server 102. In embodiments, the users associated with the mobile devices 106, 108, 110 may be buyers, while one or more users associated with the server 102 and/or one or more computing devices may be sellers. In other embodiments the users associated with the mobile devices 106, 108, 110 may be property owners or sellers who capture images of properties and upload the captured images to the server 102 and/or one or more computing devices. In other embodiments, the users associated with the mobile devices 106, 108, 110 may be individuals that are searching for vacant spots or locations in which they may want to park various vehicles, containers, pods, and so forth. For example, the vacant spots or locations may be useful for placing or positioning pods in the form of temporary makeshift structures that may be utilized for various purposes. These makeshift structures may be easily assembled and disassembled and serve as portable retail showrooms for various consumers. It is noted that other uses are also contemplated for these showrooms. In operation, each of the users of the mobile devices 106, 108, 110 may access the software application, input preferences associated with the environment of vacant spaces, time period for reserving these vacant spaces, and so forth. A variety of other preferences may also be input. The preferences that are input by the users may be routed or transmitted, via the communication network 104, to the server 102, and may be accessible via the server interface 114 of the server 102. In embodiments, the server 102 may, automatically and without user intervention, identify vacant spaces that match the preferences input by the users. The server 102 may also enable the users to, via the mobile devices 106, 108, 110, access details regarding each of the vacant spaces, e.g., whether these spaces are subject to city zoning laws or ordinances that prevent use of these spaces. Additionally, images of the vacant locations and data relating to points of interest (POIs) within a particular vicinity of the vacant locations may also be determined. Points of interest data may relate to, e.g., restaurants within a particular vicinity of the vacant locations, and so forth. Points of interest may also relate to other locations, e.g., monuments, museums, and so forth.

Figure 2:
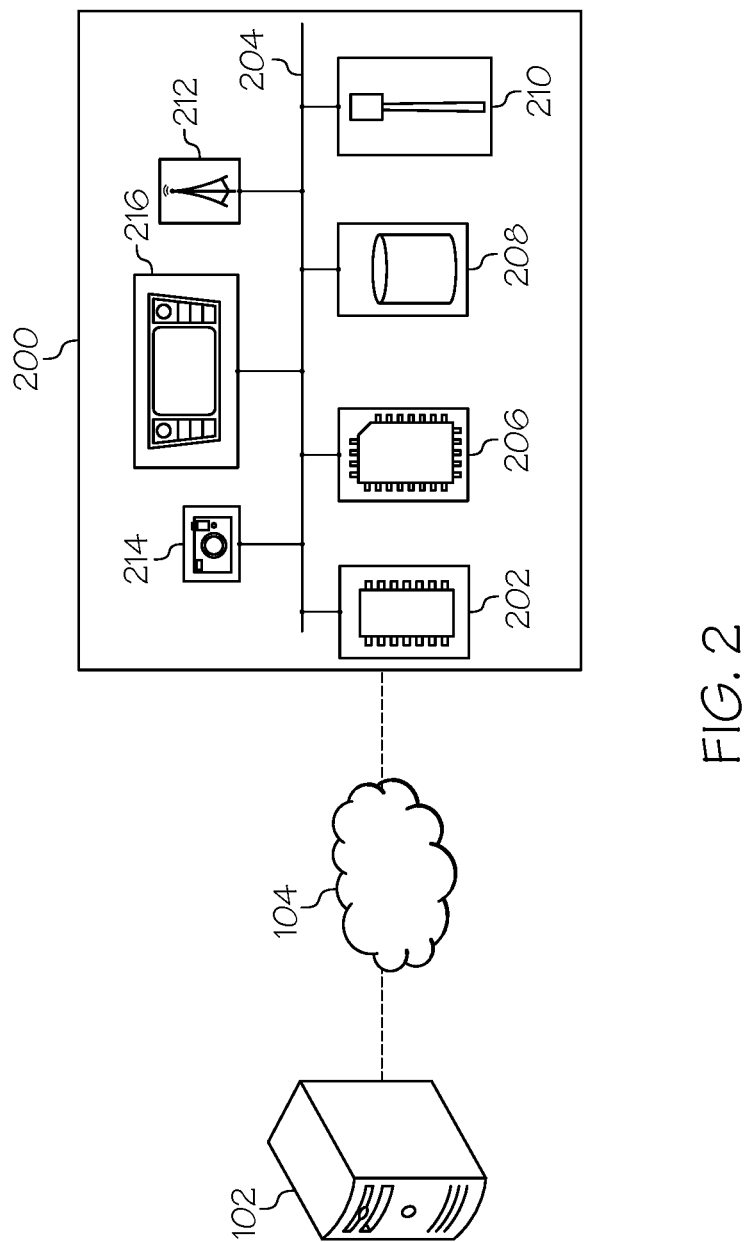
FIG. 2 schematically depicts non-limiting components of the devices of the present disclosure, according to one or more embodiments described and illustrated herein.

FIG. 2 schematically depicts non-limiting components of the devices of present disclosure, according to one or more embodiments described and illustrated herein. In particular, FIG. 2 schematically depicts a mobile device system 200 and the server 102, according to one or more embodiments described and illustrated herein.

The server 102 may be a cloud server with one or more processors, memory modules, network interface hardware, and a communication path that communicatively couples each of these components. It is noted that the server 102 may be a single server or a combination of servers communicatively coupled together.

The mobile device system 200 may include a processor 202. The processor 202 may be any device capable of executing machine readable and executable instructions. Accordingly, the processor 202 may be a controller, an integrated circuit, a microchip, a computer, or any other computing device.

The processor 202 may be coupled to a communication path 204 that provides signal interconnectivity between various modules of the mobile device system 200. Accordingly, the communication path 204 may communicatively couple any number of processors (e.g., comparable to the processor 202) with one another, and allow the modules coupled to the communication path 204 to operate in a distributed computing environment. Specifically, each of the modules may operate as a node that may send and/or receive data. As used herein, the term "communicatively coupled" means that the coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The mobile device system 200 may include one or more memory modules 206, which is coupled to the communication path 204. The one or more memory modules 206 may comprise RAM, ROM, flash memories, hard drives, or any device capable of storing machine readable and executable instructions such that the machine readable and executable instructions can be accessed by the processor 202. The machine readable and executable instructions may comprise logic or algorithm(s) written in any programming language of any generation (e.g., 1GL, 2GL, 3GL, 4GL, or 5GL) such as, for example, machine language that may be directly executed by the processor 202 or assembly language, object-oriented programming (OOP), scripting languages, microcode, etc., that may be compiled or assembled into machine readable and executable instructions and stored on the one or more memory modules 206.

Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The memory modules 206, 226 may also store GPS data associated with vacant properties, city and state regulations data, and data relating to various points of interest located with a particular vicinity of the vacant properties. The points of interest data may relate to cafes, shopping malls, and other businesses.

The mobile device system 200 may include one or more sensors 208. Each of the one or more sensors 208 are coupled to the communication path 204 and communicatively coupled to the processor 202. The one or more sensors 208 may include one or more motion sensors for detecting and measuring motion. The motion sensors may include inertial measurement units. Each of the one or more motion sensors may include one or more accelerometers and one or more gyroscopes. The one or more sensors may also include a microphone, a motion sensor, a proximity sensor, and so forth. The sensors 208 may be able to detect the proximity of one or more devices and initiate the transmission to data (e.g., digital authorization data) upon detecting these devices (e.g., smartphones of various users) within a certain proximity from these sensors.

Still referring to FIG. 2, the mobile device system 200 includes a satellite antenna 210 coupled to the communication path 204 such that the communication path 204 communicatively couples the satellite antenna 210 to other modules of the mobile device system 200. The satellite antenna 210 is configured to receive signals from global positioning system satellites. Specifically, in one embodiment, the satellite antenna 210 includes one or more conductive elements that interact with electromagnetic signals transmitted by global positioning system satellites. The received signal is transformed into a data signal indicative of the location (e.g., latitude and longitude) of the satellite antenna 210 or an object positioned near the satellite antenna 210 by the processor 202. The location information may be include the data regarding the location of the one or more mobile devices.

The mobile device system 200 may include network interface hardware 212 for communicatively coupling the mobile device system 200 with the server 102, e.g., via communication network 104. The network interface hardware 212 is coupled to the communication path 204 such that the communication path 204 communicatively couples the network interface hardware 212 to other modules of the mobile device system 200. The network interface hardware 212 may be any device capable of transmitting and/or receiving data via a wireless network, e.g., the communication network 104. Accordingly, the network interface hardware 212 may include a communication transceiver for sending and/or receiving data according to any wireless communication standard. For example, the network interface hardware 212 may include a chipset (e.g., antenna, processors, machine readable instructions, etc.) to communicate over wireless computer networks such as, for example, wireless fidelity (Wi-Fi), WiMax, Bluetooth®, IrDA, Wireless USB, Z-Wave, ZigBee, or the like. In some embodiments, the network interface hardware 212 includes a Bluetooth® transceiver that enables the mobile device system 200 to exchange information with the server 102 via Bluetooth®.

The network interface hardware 212 may utilize various communication protocols to establish a connection between multiple mobile devices 106, 108, 110 and the server 102. For example, in embodiments, the network interface hardware 212 may utilize a communication protocol that enables communication between the multiple mobile devices 106, 108, 110, and the server 102. Compatibility with other comparable communication protocols are also contemplated.

It is noted that communication protocols include multiple layers as defined by the Open Systems Interconnection Model (OSI model), which defines a telecommunication protocol as having multiple layers, e.g., Application layer, Presentation layer, Session layer, Transport layer, Network layer, Data link layer, and Physical layer. To function correctly, each communication protocol includes a top layer protocol and one or more bottom layer protocols. Examples of top layer protocols (e.g., application layer protocols) include HTTP, HTTP2 (SPDY), and HTTP3 (QUIC), which are appropriate for transmitting and exchanging data in general formats. Application layer protocols such as RTP and RTCP may be appropriate for various real time communications such as, e.g., telephony and messaging. Additionally, SSH and SFTP may be appropriate for secure maintenance, MQTT and AMQP may be appropriate for status notification and wakeup trigger, and MPEG-DASH/HLS may be appropriate for live video streaming with user-end systems. Examples of transport layer protocols that are selected by the various application layer protocols listed above include, e.g., TCP, QUIC/SPDY, SCTP, DCCP, UDP, and RUDP.

The mobile device system 200 include a camera 214. The camera 214 may have any resolution. In some embodiments, one or more optical components, such as a mirror, fish-eye lens, or any other type of lens may be optically coupled to the camera 214. In embodiments, the camera may have a broad angle feature that enables capturing digital content within a 150 degree to 180 degree arc range. Alternatively, the camera 214 may have a narrow angle feature that enables capturing digital content within a narrow arc range, e.g., 60 degree to 90 degree arc range. In embodiments, the one or more cameras may be capable of capturing high definition images in a 720 pixel resolution, a 1080 pixel resolution, and so forth. The camera 214 may capture images one or more vacant properties, various points or interest within a particular vicinity of the vacant properties, and so forth.

In embodiments, the mobile device system 200 may include a display 216 for providing visual output. The display 216 may output digital data, images and/or a live video stream of various types of data. The display 216 are coupled to the communication path 204. Accordingly, the communication path 204 communicatively couple the display 216 to other modules of the mobile device system 200, including, without limitation, the processor 202 and/or the one or more memory modules 206. The display 216 may be configured to display digital authorization data, distress messages, and so forth.

Still referring to FIG. 2, the server 102 may be a cloud server with one or more processors, memory modules, network interface hardware, and a communication path that communicatively couples each of these components. It is noted that the server 102 may be a single server or a combination of servers communicatively coupled together.

Figure 3:
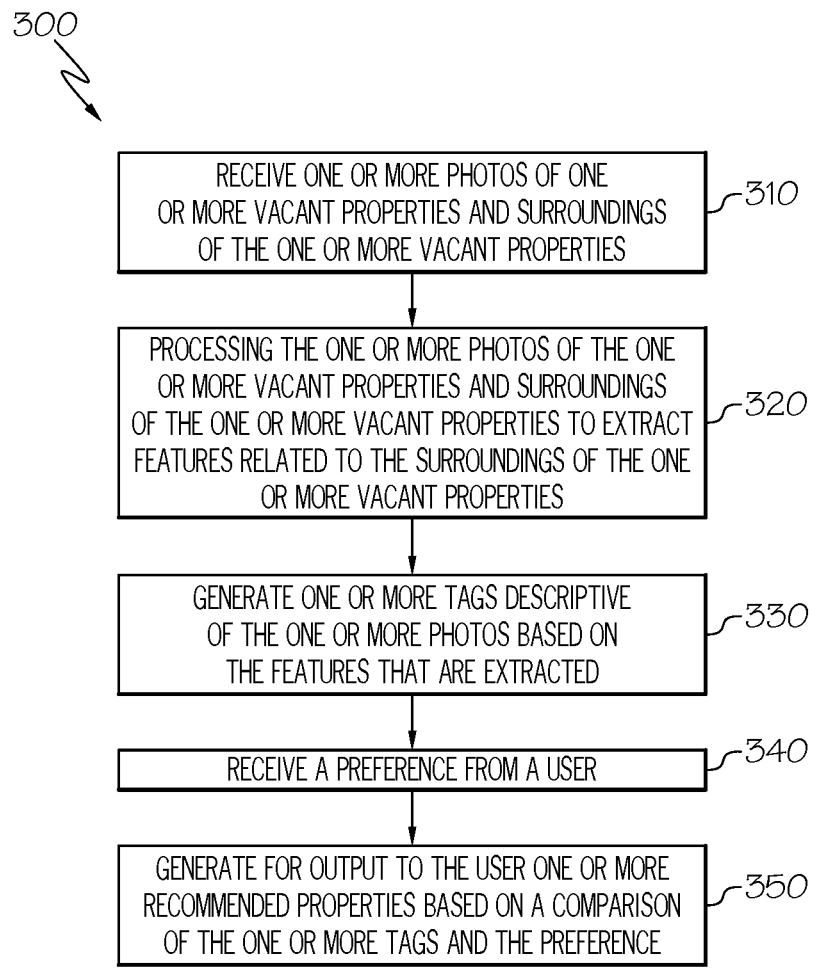
FIG. 3 depicts a flowchart describing the operation of the location identification system, according to one or more embodiments described and illustrated herein.

FIG. 3 depicts a flowchart 300 describing the operation of the location identification system, according to one or more embodiments described and illustrated herein. In embodiments, at block 310, one or more devices, e.g., devices associated with property owners, sellers, vendors, and so forth, may be utilized to capture images of vacant properties. For example, a property owner may capture one or more photos of one or more vacant properties and surroundings of the one or more vacant properties. The captured images may be transmitted to the server 102. In embodiments, these images may be captured by a camera on a smartphone of the property owner. For example, a property owner may capture (e.g., via his smartphone) one or more images of a property, e.g., an empty plot of land near the beach and upload the captured images to the server 102. Additionally, the property owner may also capture images of restaurants, bars, and various shops (e.g., surf board shops, boat rental shops, and so forth) within a particular proximity of the vacant property, e.g., 0.5 miles, 1 mile, 2 miles, and so forth. The images of the surroundings of the vacant property may also include images of nature within a particular proximity of the vacant property, e.g., mountains, trees, shrubs, images of sunset, and so forth. It is noted that other images associated with the surroundings of the vacant property may also be captured and received by the server 102, or associated with one or more computing devices that are communicatively coupled to the server 102. In some embodiments, devices other than devices of the owners, sellers, vendors may be utilized to capture images of vacant properties. For example, cameras of vehicles may capture images of vacant properties and upload the captured images to the server 102. As another example, cameras fixed to infrastructure devices, such as security cameras, may capture images of vacant properties and upload the captured images to the server 102.

In embodiments, at block 320, the server 102 may process the one or more photos of the one or more vacant properties to extract features related to the surroundings of the one or more vacant properties. For example, the server 102 may analyze each of the images in order to determine details regarding various respective features of the surroundings of the one or vacant properties. In particular, details regarding the scenery (e.g., mountainous terrains, trees, etc.) near the one or more vacant properties, names and other details associated with restaurants, boat rental shops, etc., may be determined using a combination of one or more digital image analysis and processing techniques. These techniques may utilize a combination of artificial intelligence based machine learning processes in order to extract the pertinent features and details associated with the one or more vacant properties. It is noted that performing such analysis involves analyzing one or more images to obtain features or details of various objects using optical character recognition, and so forth. A variety of other image analysis and recognition techniques may also be utilized. In embodiments, techniques for obtaining details associated with various features may be based on obtaining point of interest data via extracting map data from a digital image, GPS data, and so forth. In embodiments, the feature data extracted from analysis of one or more images and via one or more image analysis techniques is independent and distinct from the features determined using map data, GPS data, and so forth. In embodiments, the server 102 may operate so as to identify the authenticity of the locations and other details of one or more properties by independently analyzing and comparing map data and image data associated with a particular location.

In block 330, the server 102 may generate one or more tags descriptive of the one more photos based on the features that are extracted. For example, the server 102 may analyze the data associated with the one or more photos and generate one or more tags associated with the content included in each of the one or more photos. For example, the analyzed data associated with the one or more photos may be associated with a digital comment or link in the form of a descriptor (textual and image based descriptor) that identifies the one or more vacant properties, e.g., an empty parking spot, an empty track of land in a scenic location near a portion of the beach or near a restaurant, and so forth. It is noted that one or more digital tags may also be linked with additional areas surrounding the one or more vacant properties in the form of the empty parking spot, an empty track of land, and so forth.

In block 340, the server 102 may receive one or more preferences from a user. In particular, respective users of each of the mobile devices 106, 108, 110 illustrated in FIG. 1 may select one or more preferences on a digital image displayed as part of user interfaces that is output on the respective mobile devices 106, 108, 110. For example, each of the respective user interfaces may display interactive icons with text that is indicative of various characteristics of the one or more vacant properties such as, e.g., scenic view, ocean view, coffee shop, shopping plaza, and so forth. These features may indicate that the users are interested in a vacant properties that are adjacent to, in front of, or within a certain proximity of a coffee shop or a shopping plaza, or be located in an area that has a view of the ocean, a scenic view, and so forth. In order to indicate his or her preferences for certain types of vacant properties, the users may select one or more interactive icons. It is noted that, in embodiments, each of the users may also input particular criteria in text fields that may be displayed on the respective user interfaces of the mobile devices 106, 108, 110.

In block 350, the server 102 may generate, for output, to the user one or more recommended properties based on a comparison of the one or more tags and preferences. For example, the server 102 may receive each of the respective selections of interactive icons and/or text input by each of the users of the mobile devices 106, 108, 110. Thereafter, the server 102 may analyze data included in the text and data associated each of the selected interactive icons and compare the analyzed data with a database that includes each of the one or more tags. Thereafter, the server 102 may identify one or more generated tags as matching or being associated with one or more of the preferences provided by the users. For example, in embodiments, the server 102 may, in real time, identify one or more tags that are associated with one or more vacant properties that may be adjacent to or within a particular proximity of a coffee shop, a shopping plaza, a strip of land near the beach, or a strip of land having a clear view of the sunset.

Thereafter, in embodiments, the server 102 may transmit the identified one or more tags, via the communication network 104, to the users of the mobile devices 106, 108, 110. The identified tags may then be displayed on the respective users interfaces of the mobile devices 106, 108, 110. For example, the identified tags specific to various vacant properties that were identified may be displayed as images of the vacant properties that were captured by, e.g., the property owners of these various properties. It is noted that the identified tags may be displayed on the respective user interfaces of the mobile devices 106, 108, 110 in real time.

Figure 4:
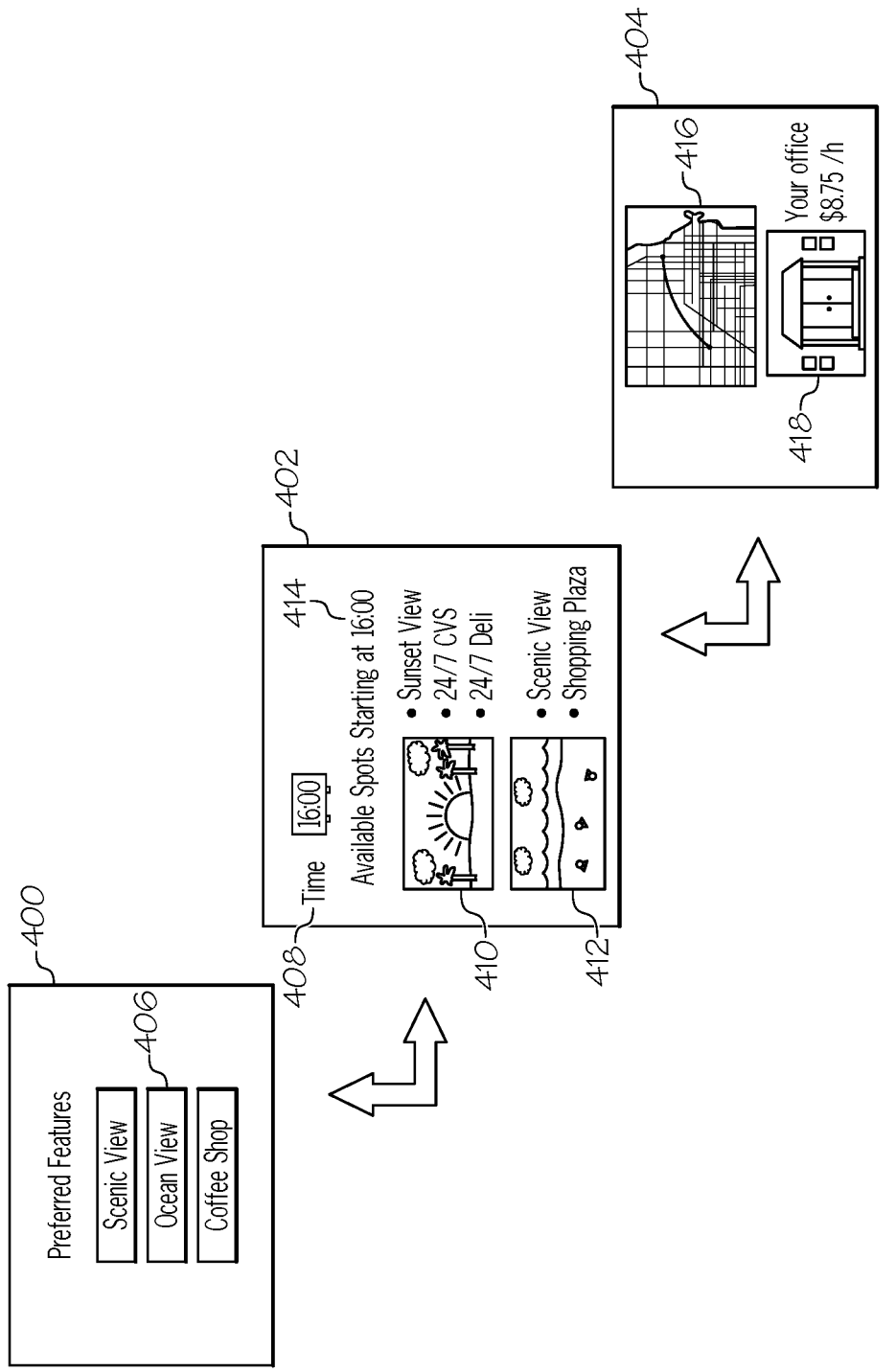
FIG. 4 depicts example digital pages that may displayed on the user interfaces of one or more mobile devices, according to one or more embodiments described and illustrated herein.

FIG. 4 depicts an example digital pages that may displayed on the user interfaces of one or more of the mobile devices 106, 108, 110. In particular, FIG. 4 illustrates digital pages 400, 402, 404, which may be displayed as a result of a user selecting various preferences for vacant properties. As illustrated, the example digital page 400 may list a plurality of interactive icons that may be descriptive of various features of vacant properties. For example, the interactive icons may include list text such as, e.g., Scenic View, Ocean View 406, and coffee shop. Such text may be descriptive of the location of one or more vacant properties. In embodiments, a user, e.g., the user or owner of the mobile device 106, may select the Ocean View 406 interactive icon. In embodiments, the user or owner may also select the scenic view and coffee shop interactive icons. In yet other embodiments, the user may input text in text fields (now shown in FIG. 4) indicating his or her preference for, e.g., a vacant property having a view of a sunset, and so forth. A variety of other features may also be input into the software program, indicating a preference for vacant properties having particular features.

In embodiments, the selection of the interactive icons and any text that is input into the software application may be transmitted, via the communication network 104, to server 102. As explained above, these selections and any text that is input may be viewed via the server interface 114 in real time by, e.g., owners of vacant properties. In embodiments, the server 102 may, automatically and without user intervention, identify vacant properties that include the features as indicated in the interactive icons and as input in one or more text fields and transmit instructions for outputting data relating to the identified vacant properties on the user interface of the mobile device 106. For example, as illustrated in the example digital page 402, the user may be able to view, e.g., on mobile device 106, the identified vacant properties, the time during which these vacant properties are available for use, and other details specific to these vacant properties.

In particular, the example digital page 402 indicates that an example vacant property 410 with a sunset view is available from a particular time 408, e.g., 16:00 or 4:00 PM. Additionally, in embodiments, other properties and businesses located within a particular vicinity of the vacant property 410 (e.g., points of interest) may also be listed such as, e.g., a 24/7 operating drugstore and a 24/7 operating Deli. In embodiments, the example digital page 402 may also list another vacant property 412 that has a scenic view and which may have a shopping plaza located within a particular vicinity of the vacant property 410 having a scenic view. In embodiments, the example digital page 404 illustrates a map 416 indicating a distance and a route from a location that is specific to a user and the location of one or more of the vacant properties identified by the server 102, as displayed in the example digital page 402. In embodiments, a user-specific location 418 may be the office of the user. Other locations are also contemplated.

Figure 5:
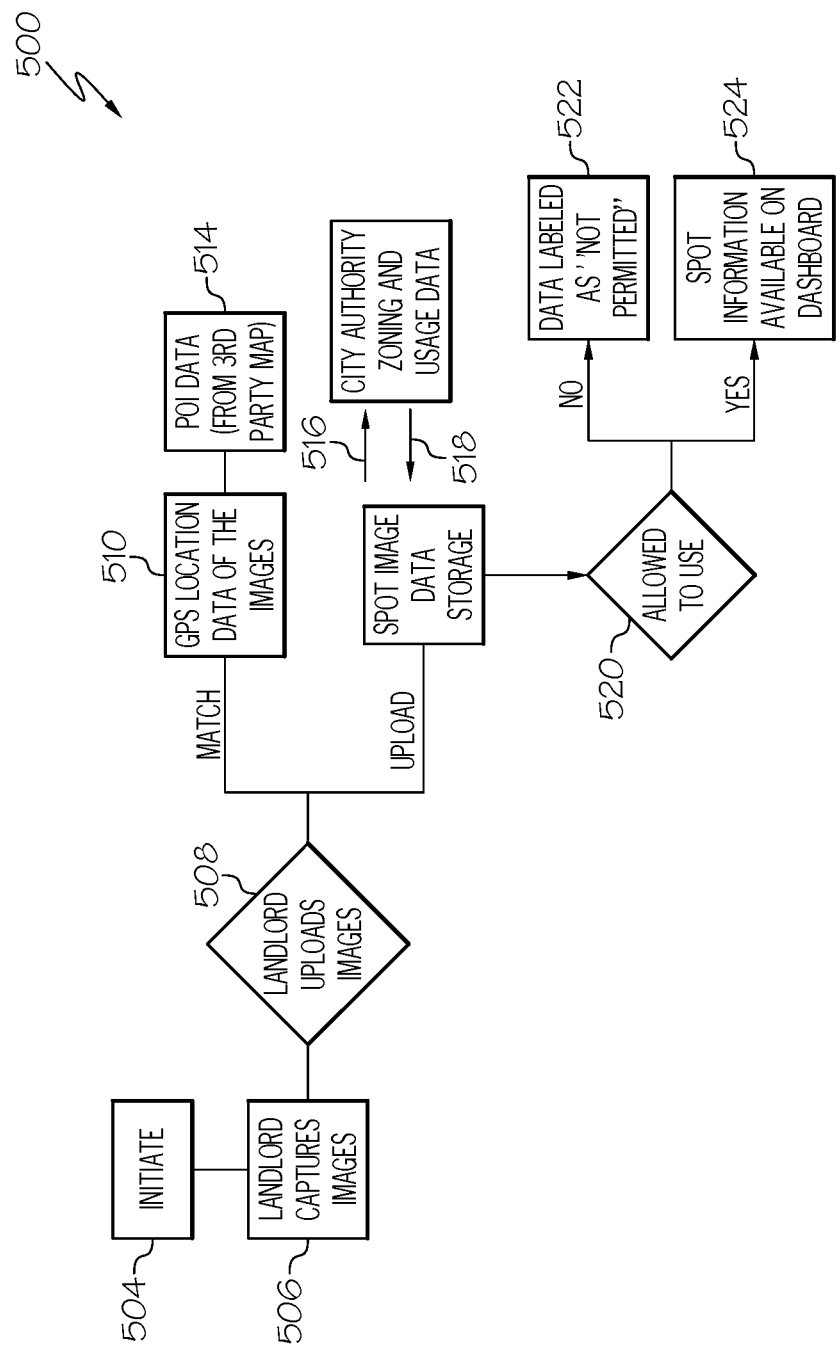
FIG. 5 depicts a block diagram illustrative of the implementation of the vacant location identification system, implemented using the server, according to one or more embodiments described and illustrated herein.

FIG. 5 depicts an example process 500 of the implementation of the vacant location identification system 100, implemented with the server 102, according to one or more embodiments described and illustrated herein. In embodiments, in block 504, the example process 500 may be initiated. In block 506, a user (e.g., a property owner or landlord) performs capturing images of vacant properties owned by the user. In embodiments, a live video stream may also be captured by the user. Thereafter, the landlord may captured images or the live video stream to a server including a database in block 508. The software application as described in the present disclosure may identify one or more GPS locations data specific to the vacant properties owned by the user in block 510 and identify point of interest data within a particular vicinity of the vacant properties of the user in block 514. For example, as stated above, the points of interest data may be associated with shopping complexes, coffee shops, and other businesses within the particular vicinity of the vacant properties may be identified by the software application. For identifying these points of interest, the software application may utilize third party applications such as, e.g., third party maps associated with public and private sources, and so forth.

In embodiments, in step 516, spot images or images of vacant properties that are uploaded via the software application may be transmitted to one or more city and state zoning authorities storing respective proprietary databases. In step 518, zoning and usage data corresponding to the vacant properties may be transmitted to the server. In step 520, the software application may determine whether a particular vacant property is available for use based on data directly from the city and state zoning authorities indicating an availability or allowed to use status for each of the vacant properties. In particular, if a particular vacant property is available for use, a digital tag may be generated to indicate that a particular vacant property is available for use, as indicated in block 524. It is noted that this information may be displayed, in real time, on the user interface of a mobile device. Alternatively, if the software application determines that a particular vacant property is not available for use, a digital tag may be generated to indicate that the particular vacant property is not currently available for use, as indicated in block 522. It is noted that this information may be displayed, in real time, on the user interface of a mobile device.

It should now be understood that the embodiments of the present disclosure are directed to a location matching method. The method comprises receiving one or more photos of one or more vacant properties and surroundings of the one or more vacant properties, processing the one or more photos of the one or more vacant properties and surroundings of the one or more vacant properties to extract features related to the surroundings of the one or more vacant properties, generating one or more tags descriptive of the one or more photos based on the features that are extracted, receiving a preference from a user, and generating for output to the user one or more recommended properties based on a comparison of the one or more tags and the preference. It should also be understood that the embodiments of the present disclosure are also directed to a location matching system comprising a processor configured to perform operations comprising receiving one or more photos of one or more vacant properties and surroundings of the one or more vacant properties, processing the one or more photos of the one or more vacant properties and surroundings of the one or more vacant properties to extract features related to the surroundings of the one or more vacant properties, generating one or more tags descriptive of the one or more photos based on the features that are extracted, receiving a preference from a user, and generating for output to the user one or more recommended properties based on a comparison of the one or more tags and the preference.

In a first aspect, a location matching method comprises receiving one or more photos of one or more vacant properties and surroundings of the one or more vacant properties, processing the one or more photos of the one or more vacant properties and surroundings of the one or more vacant properties to extract features related to the surroundings of the one or more vacant properties, generating one or more tags descriptive of the one or more photos based on the features that are extracted, receiving a preference from a user, and generating for output to the user one or more recommended properties based on a comparison of the one or more tags and the preference.

In a second aspect, the location matching method of the first aspect, wherein the one or more tags includes a type of view from at least one of the one or more vacant properties.

In a third aspect, the location matching method of the first or the second aspect, wherein the one or more tags include a type of point of interest (POI) within a threshold distance from the at least one of the one or more vacant properties.

In a fourth aspect, the location matching method of any of the first to the third aspects, wherein generating one or more tags comprises extracting metadata from the one or more photos, querying a POI database with the metadata, receiving a plurality of POIs from the POI database, and categorizing the plurality of POIs into types.

In a fifth aspect, the location matching method of any of the first to the fourth aspects, wherein generating one or more tags is automatically performed by one or more computer vision techniques.

In a sixth aspect, the location matching method of any of the first to the fifth aspects, wherein the preference form the user is associated with at least a time and a location.

In a seventh aspect, the location matching method of any of the first to the sixth aspects, further comprising receiving a selection of a property from the one or more recommended properties from the user, receiving a location of a vehicle of the user, and directing the vehicle to drive to the location.

In an eighth aspect, the location matching method of any of the first to the seventh aspects, wherein a machine learning algorithm generates the one or more tags descriptive of the one or more photos based on the extracted features.

In a ninth aspect, the location matching system of the first to the eighth aspects, further comprising transmitting locations of the one or more vacant properties to a remote server, and updating availability information of the one or more vacant properties in response to receiving authorization on the one or more vacant properties from the remote server.

In a tenth aspect, the location matching system of any of the first to the ninth aspects, wherein the one or more photos of one or more vacant properties and surroundings of the one or more vacant properties are captured by one or more vehicles.

In an eleventh aspect, the location matching system of any of the first to the tenth aspects, further comprising outputting, on a user interface, the one or more vacant properties on a map along with the one or more tags associated with the one or more vacant properties.

In a twelfth aspect, a location matching system comprises a processor configured to perform operations comprising receiving one or more photos of one or more vacant properties and surroundings of the one or more vacant properties, processing the one or more photos of the one or more vacant properties and surroundings of the one or more vacant properties to extract features related to the surroundings of the one or more vacant properties, generating one or more tags descriptive of the one or more photos based on the features that are extracted, receiving a preference from a user, and generating for output to the user one or more recommended properties based on a comparison of the one or more tags and the preference.

In a thirteenth aspect, the location matching system of the twelfth aspect, wherein the one or more tags include a type of view from at least one of the one or more vacant properties.

In a fourteenth aspect, the location matching system of the twelfth aspect or the thirteenth aspect, wherein the one or more tags include a type of POI within a threshold distance from at least one of the one or more vacant properties.

In a fifteenth aspect, the location matching system of any of the twelfth to the fourteenth aspects, wherein generating one or more tags comprises extracting metadata from the one or more photos, querying a POI database with the metadata, receiving a plurality of POIs from the POI database, and categorizing the plurality of POIs into types.

In a sixteenth aspect, the location matching system of any of the twelfth to the fifteenth aspects, wherein the generating one or more tags is automatically performed by one or more computer vision techniques.

In a seventeenth aspect, the location matching system of any of the twelfth to the sixteenth aspects, wherein the preference from the user is at least a time and a location.

In an eighteenth aspect, the location matching system of any of the twelfth to the seventeenth aspects, further comprising receiving a selection of a property from the one or more recommended properties from the user, receiving a location of a vehicle of the user, and directing the vehicle to drive to the location.

In a nineteenth aspect, the location matching system of any of the twelfth to the eighteenth aspects, wherein a machine learning algorithm generates the one or more tags descriptive of the one or more photos based on the extracted features.

In a twentieth aspect, the location matching system of any of the twelfth to the nineteenth aspects, wherein the processor is further configured to perform operations comprising transmitting locations of the one or more vacant properties to a remote server, and updating availability information of the one or more vacant properties in response to receiving authorization on the one or more vacant properties from the remote server.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A location matching method, comprising:
   receiving one or more photos of one or more vacant properties and surroundings of the one or more vacant properties;

processing the one or more photos of the one or more vacant properties and surroundings of the one or more vacant properties to extract features related to the surroundings of the one or more vacant properties;

generating one or more tags descriptive of the one or more photos based on the features that are extracted, wherein the one or more tags are digital;

receiving a preference from a user, wherein the preference from the user is input into one or more text fields by the user; and generating for output to the user one or more recommended properties based on a comparison of the one or more tags and the preference, wherein the one or more tags each include:
  type of view, including an ocean view or a sunset view from at least one of the one or more vacant properties,
  information on available time of the one or more vacant properties, and
  an indication as to whether the one or more vacant properties are available for use based on zoning and/or usage information retrieved from a regulatory zoning authority, wherein the indication describes whether the one or more vacant properties are available for use as a temporary showroom.

2. The location matching method of claim 1, wherein the one or more tags include a type of a point of interest (POI) within a threshold distance from the at least one of the one or more vacant properties.

3. The location matching method of claim 1, wherein generating one or more tags comprises:
  extracting metadata from the one or more photos;
  querying a type of a point of interest (POI) database with the metadata;
  receiving a plurality of POIs from the POI database; and
  categorizing the plurality of POIs into types.

4. The location matching method of claim 1, wherein generating one or more tags is automatically performed by one or more computer vision techniques.

5. The location matching method of claim 1, further comprising:
  receiving a selection of a property from the one or more recommended properties from the user;
  receiving a location of a vehicle of the user; and
  directing the vehicle to drive to the location.

6. The location matching method of claim 1, wherein a machine learning algorithm generates the one or more tags descriptive of the one or more photos based on the extracted features.

7. The location matching method of claim 1, further comprising:
  transmitting locations of the one or more vacant properties to a remote server; and
  updating availability information of the one or more vacant properties in response to receiving authorization on the one or more vacant properties from the remote server.

8. The location matching method of claim 1, wherein the one or more photos of one or more vacant properties and surroundings of the one or more vacant properties are captured by one or more vehicles.

9. The location matching method of claim 1, further comprising:
  outputting, on a user interface, the one or more vacant properties on a map along with the one or more tags associated with the one or more vacant properties.

10. A location matching system, comprising:
  a processor configured to perform operations comprising:
  receiving one or more photos of one or more vacant properties and surroundings of the one or more vacant properties;
  processing the one or more photos of the one or more vacant properties and surroundings of the one or more vacant properties to extract features related to the surroundings of the one or more vacant properties;
  generating one or more tags descriptive of the one or more photos based on the features that are extracted, wherein the one or more tags are digital;
  receiving a preference from a user, wherein the preference from the user is input into one or more text fields by the user; and
  generating for output to the user one or more recommended properties based on a comparison of the one or more tags and the preference,
  wherein the one or more tags each include:
    a type of view, including an ocean view or a sunset view from at least one of the one or more vacant properties,
    information on available time of the one or more vacant properties, and
    an indication as to whether the one or more vacant properties are available for use based on zoning and/or usage information retrieved from a regulatory zoning authority, wherein the indication describes whether the one or more vacant properties are available for use as a temporary showroom.

11. The location matching system of claim 10, wherein the one or more tags include a type of a point of interest (POI) within a threshold distance from at least one of the one or more vacant properties.

12. The location matching system of claim 10, wherein generating one or more tags comprises:
  extracting metadata from the one or more photos;
  querying a type of a point of interest (POI) database with the metadata;
  receiving a plurality of POIs from the POI database; and
  categorizing the plurality of POIs into types.

13. The location matching system of claim 10, wherein generating one or more tags is automatically performed by one or more computer vision techniques.

14. The location matching system of claim 10, wherein the preference from the user is at least a time and a location.

15. The location matching system of claim 10, further comprising:
  receiving a selection of a property from the one or more recommended properties from the user;
  receiving a location of a vehicle of the user; and
  directing the vehicle to drive to the location.

16. The location matching system of claim 10, wherein a machine learning algorithm generates the one or more tags descriptive of the one or more photos based on the extracted features.

17. The location matching system of claim 10, wherein the processor is further configured to perform operations comprising:
  transmitting locations of the one or more vacant properties to a remote server; and
  updating availability information of the one or more vacant properties in response to receiving authorization on the one or more vacant properties from the remote server.

* * * * *